J. H. McELROY.
VOTING MACHINE.
APPLICATION FILED FEB. 23, 1907.

1,044,799.

Patented Nov. 19, 1912.

J. H. McELROY.
VOTING MACHINE.
APPLICATION FILED FEB. 23, 1907.

1,044,799.

Patented Nov. 19, 1912.
5 SHEETS—SHEET 2.

J. H. McELROY.
VOTING MACHINE.
APPLICATION FILED FEB. 23, 1907.

1,044,799.

Patented Nov. 19, 1912.

Witnesses:

Inventor:
John Howard McElroy

J. H. McELROY.
VOTING MACHINE.
APPLICATION FILED FEB. 23, 1907.

1,044,799.

Patented Nov. 19, 1912.

UNITED STATES PATENT OFFICE.

JOHN HOWARD McELROY, OF CHICAGO, ILLINOIS.

VOTING-MACHINE.

1,044,799.   Specification of Letters Patent.   Patented Nov. 19, 1912.

Application filed February 23, 1907. Serial No. 358,815.

*To all whom it may concern:*

Be it known that I, JOHN HOWARD MC-ELROY, a citizen of the United States, and resident of Chicago, in the county of Cook and State of Illinois, have invented certain new and useful Improvements in Voting-Machines, of which the following is a full, clear, and exact specification.

My invention is concerned with voting machines of the type used in general elections, and comprises, among other features, (1) a novel interlocking mechanism for preventing the voting by any one for more than the number of candidates to be elected; (2) a novel lock-out mechanism for use where the machine is to be used in general elections for voters having different franchises, or in primary elections where the different parties hold their primaries on the same day; (3) a novel straight-ticket mechanism; (4) a novel key; and finally (5) a novel free-balloting mechanism.

To illustrate my invention, I annex hereto five sheets of drawings, in which the same reference characters are used to designate identical parts in all the figures, of which,—

Fig. 4 is a front elevation of the lower part of the machine, the left-hand portion thereof being in section on the line E—E of Fig. 5, while the right-hand portion thereof is in section on the line F—F of Fig. 6.

Figure 3:
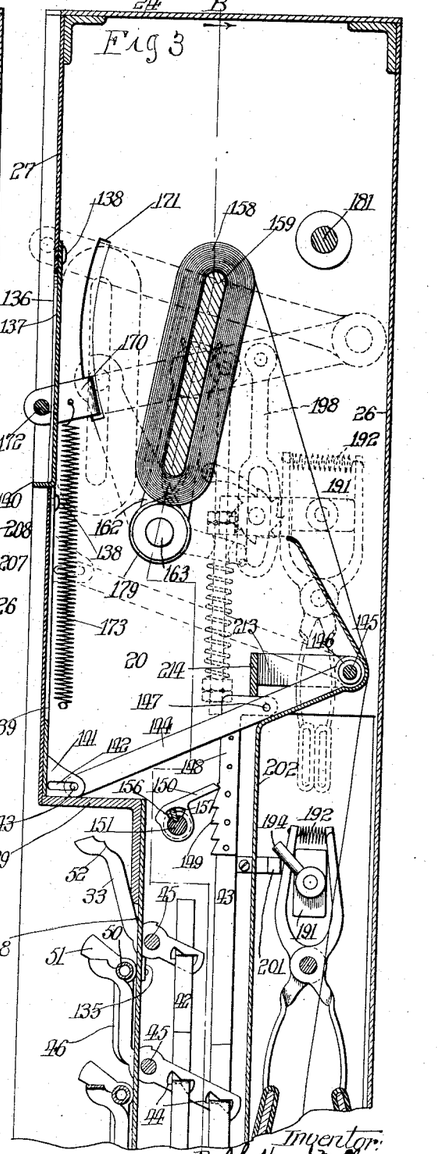

In carrying out my invention, I preferably provide the end castings 20 and 21, generally U-shaped in cross section, the open sides thereof being closed by the end plates 22 and 23, respectively. A top plate 24, a bottom plate 25, and a back plate 26 make up the casing, with the exception of the front plate. The upper portion 27 thereof is nearly in line with the forward surfaces of the sections 20 and 21, and is adjacent the free-balloting mechanism. The intermediate portion 28 serves as the ballot plate, and the keys are mounted therein, and as is best shown in Fig. 3, it is set in so as to form a sort of a recess, as it were, in which the keys are located, so that they are protected. The section 27 and the section 28 are connected by the angle iron 29. The lower portion of the front plate is made up of the door portion 30, which when opened permits the inspection of the registers, through the glass plate 31 and the extreme lower portion 32. The door 30 and the portion 32 are preferably flush with the front portions of the castings 20 and 31, so that the recess for the keys is bounded on all sides thereof.

Figures 5, 6, 11, 12, 13, 14, 15:
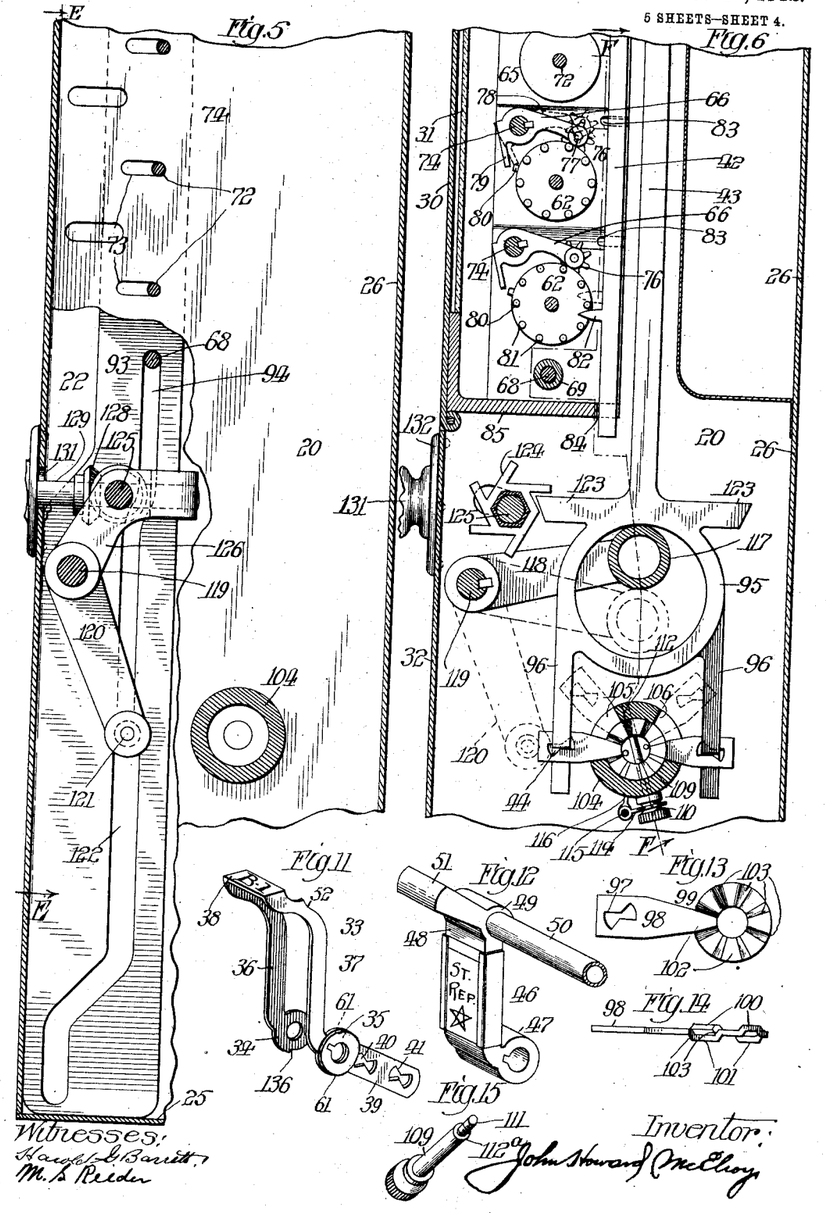
Figs. 5 and 6 are vertical sections on the lines G—G, and H—H of Fig. 4, respectively.
Fig. 11 (Sheet 4) is a perspective view of one of the candidate keys detached.
Fig. 12 is a similar view of one of the straight-ticket levers detached.
Figs. 13 and 14 are side and top plan views of one of the cam interlocking elements.
Fig. 15 is a perspective view of one of the screws employed in connection with the interlocking mechanism for grouping them into single or multi candidate-to-be-elected groups.

The keys 33, one of which is shown in perspective in Fig. 11, are preferably stamped up of sheet metal, and consist of the hub portions 34 and 35 having the arms 36 and 37 connected by the number plate 38, which preferably has a letter thereon representing the horizontal row and a number representing the vertical column, so that by means of these two reference characters the associated registers can be identified. The hub 35 has projecting therefrom into the interior of the casing, the arm 39, which has the hour-glass shaped recesses 40 and 41 adapted to receive the ends of the actuating bars 42 and the interlocking straps 43, respectively. As seen in Fig. 4, the upper ends of the actuating bars and both ends of the interlocking straps are offset, as at 44, so that they will pass through the recesses 40 and 41 and be held from movement therein except as is necessitated by the angular movement of the arm 39, it being readily understood that when the arm 39 is in one position the bar and straps will have their offsets 44 resting upon one of the sides, while in the other position it will rest upon the other side; by the term side reference being had to the reëntrant sides of the hexagonal polygon constituting the apertures 40 and 41. As will be seen in Fig. 1, the arms 36 and 37 are slightly divergent, so that the hubs 34 and 35 of adjacent keys will press against each other to form a frictional engagement. This frictional engagement assists in holding the keys in their operated position against the tendency of the weight of the actuating bars 42 and the interlocking straps 43 connected therewith to draw them down. The keys are strung on the rods 45 located just inside of the plate 28 and extending between the castings 20 and 21.

Figure 7:
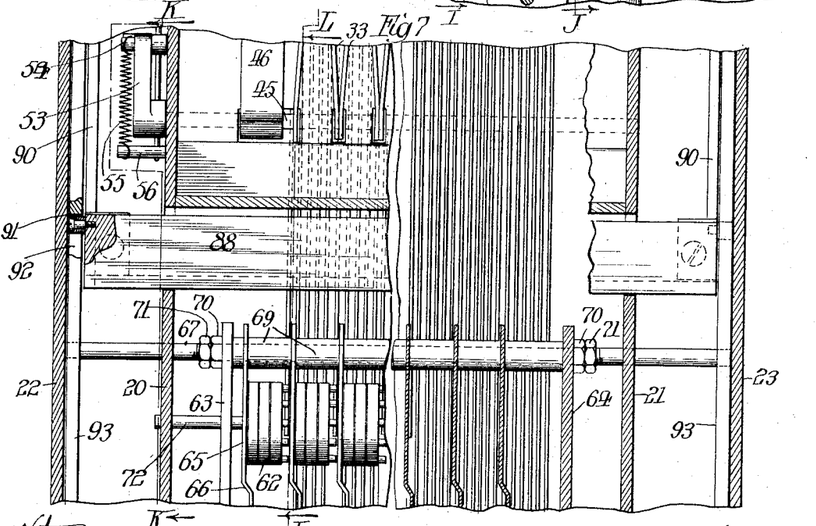
Fig. 7 is a front elevation of the central portion of the machine, the left-hand side thereof being in section on the line I—I of Fig. 9, while the right-hand side thereof is in section on the line J—J of the same figure.

To simultaneously move all the keys in any horizontal party-row to operated position, I preferably employ straight-ticket mechanism consisting of the straight-ticket levers 46, one of which is shown detached in Fig. 12, which consists of the hub portion 47, which is preferably splined on the associated shaft 45, the arm portion 48, the bearing portion 49, in which is mounted the tube or rod 50 extending across the machine and connecting the two levers 46 devoted to the single party, and the handle portion 51. The tube or rod 50 is adapted to normally engage the recessed portions 52 on the arms 36 and 37 of the keys, so that as the levers 46 are swung down, all the keys 33 in that row are simultaneously operated. I preferably employ means to insure the straight-ticket levers resting either in their operated or their unoperated position, and for this purpose I secure on their ends, within the castings 20 and 21, the arms 53, best seen in Figs. 2 and 7, which arms carry pins 54 at their outer ends, which pins are connected by the helically-coiled tensile-spring 35 with the pin 56 projecting from the castings 20 and 21, so that the tension of the spring 55 tends to hold the lever 46 either in its operated position, with the upper end of the lever 53 resting against the pin 56, or in its operated position, in which it is held from further movement by the tension of the spring, by the limit placed on the movement of the keys 33 against which it rests. I preferably provide means for preventing any attempt to operate the straight-ticket levers for more than one party at a time, although this is not absolutely necessary because the candidate-interlocking mechanism serves to prevent this. Such additional interlocking mechanism for the straight-ticket levers, however, tends to remove any possibility of undue strain being thrown on this candidate-interlocking mechanism by the straight-ticket mechanism. When this straight-ticket interlocking-mechanism is employed, it preferably takes the form of the cable 57 extending between and secured to a pin 58 projected from the associated casting 20 or 21 and the lowermost of the pins 57, the cable being alternately passed on opposite sides of the anti-friction roller 59 carried by the upper ends of the arms 53 and the hubs 60 of said arms, so that as one pair of the straight-ticket levers 53 are moved to operated position, the entire slack in the cable 57 is taken up, thus preventing the operation of another pair of straight-ticket levers without first returning the first pair. I may increase the friction of the keys 33 and assist their being moved to operated position by the straight-ticket mechanism by adding the washers 61, as indicated in Fig. 11, splined to the shafts 45.

Figure 8:
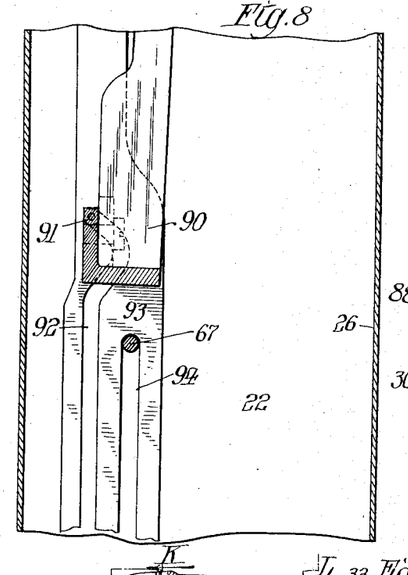
Figs. 8 and 9 are vertical sections on the lines K—K, and L—L of Fig. 7, respectively.
Figure 9:
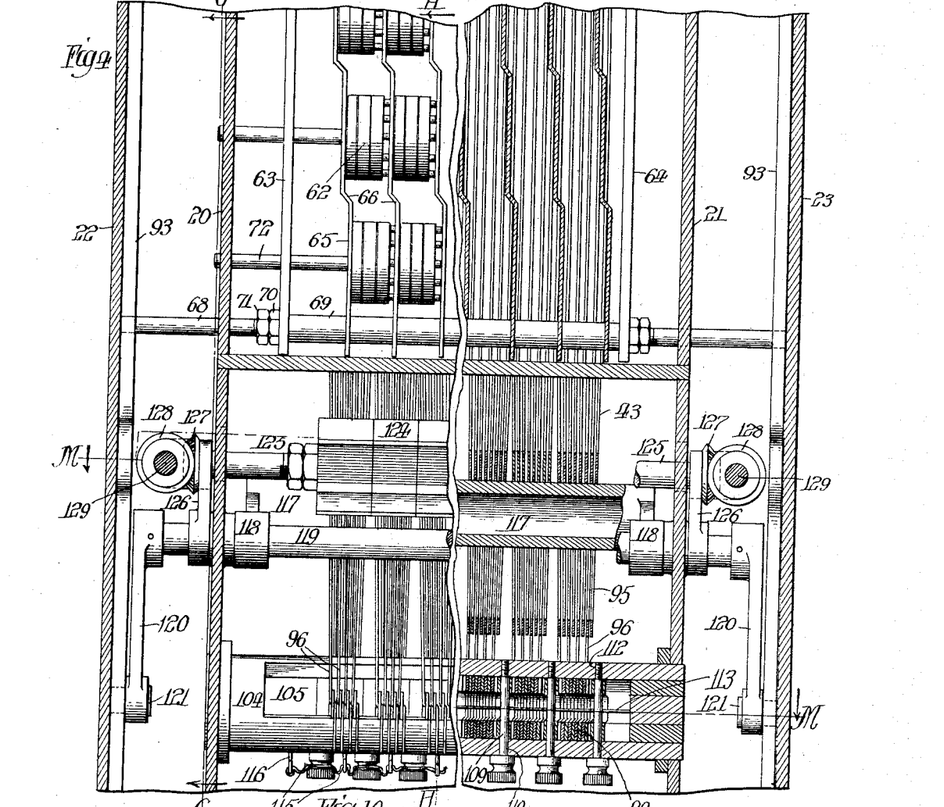
Figure 10:
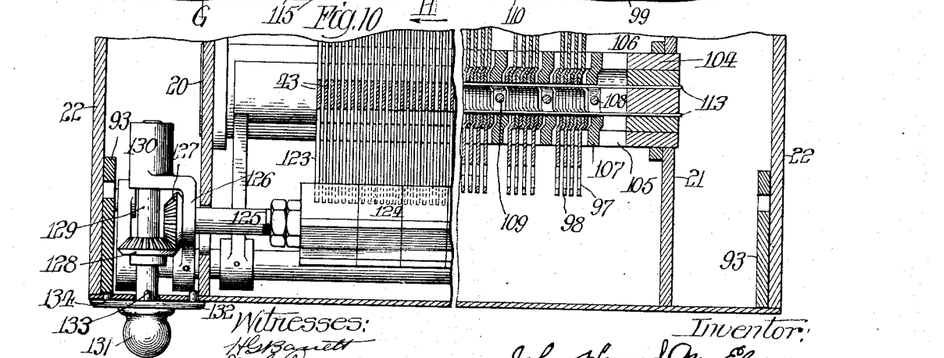
Fig. 10 (Sheet 3) is a horizontal section on the line M—M of Fig. 4.

The registers 62, as best seen in Figs. 4, 6, 7 and 9, are preferably mounted in a framework made up of the end plates 63 and 64, and the intermediate separating plates 65, which are offset between each pair of registers, as seen at 66, and the transverse rods 67 and 68. The plates 65 are spaced apart the proper distance by the sleeves 69 strung on the rods 67 and 68, and the nuts 70 and the lock nuts 71 are employed to clamp the parts of the framework together. At suitable intervals, the transverse register-supporting rods 72 are passed through the plates 63, 64 and 65, and preferably through slots 73 in the castings 20 and 21, so that the registers may be re-set by turning the shafts 72 from the ends of the machine after the shafts 74, also extending through the vertical plates of the register frame and the slots 75 in the end castings 20 and 21, have been turned to the dotted-line position of Fig. 6, to raise the carrying pinions 76 out of mesh with the register wheels. These carrying pinions 76 are strung upon the shafts 77 supported by the arms 78, which are splined on the shaft 74, and are preferably connected at their ends by the cross piece 79, which coöperates with the peripheral lugs 80 projecting from the register wheels to stop them after they have been turned to their zero position. The units registering wheels are provided with the ten teeth 81, which preferably take the form of short pins, and the actuating bars 42 have the lugs 82, which normally project between two of the teeth, so that when the actuating bar is moved from the full-line position shown in Fig. 6 to the dotted-line position, the register will be advanced one unit. The actuating bars 42 are guided into engagement with the teeth 81 by reason of the fact that just before they reach the teeth they pass through the recesses 83 cut in the plates 65 at the offsets 66. They are also guided at the bottom by passing through recesses 84 formed in the horizontal web of the angle bar 85, upon which the register frame rests. It will be understood that the keys are rocked to lift the bars 42 and actuate the registers, and when the machine is reset, the register frame is moved to the left by mechanism to be described, so as to disengage the actuating teeth 82 from the register teeth 81, so that when the actuating bars 42 are re-set, the registers will not be unactuated, although it will be understood that if the key is moved back by the voter before leaving the booth, the register is unactuated, and he is thereby enabled to change his vote and correct mistakes. Before the actuating bars 42 are re-set, however, I preferably provide means for accurately positioning the bars 42 and the attached keys 33 in their operated or their unoperated position, this mechanism being best shown in Figs. 8 and 9, where it will be seen that each bar 42 is provided with a triangular projection 86, which is so located relative to the angular edge 87 of the angle bar 88 extending across the machine that as the angle bar is swung from its full-line position of Fig. 9 to its dotted-line position, the edge 87 will engage with one side or the other of the triangular lug 86, depending upon whether the key has been operated more than half way or not, and thus move the actuating bar exactly to its operated or its unoperated position. To oppose the thrust of the angle bar 88, I extend across the machine, just opposite and between the actuating bars 42 and the interlocking straps 43, the plate 89, which is of sufficient width and has sufficient rigidity to receive the thrust of the angle bar 88 transmitted thereto by the actuating bars 42. The angle bar 88 is secured at its ends to the ends of the supporting levers 90, which are pivoted in the castings 20 and 21 upon the second of the rods 45 from the bottom, this particular rod being extended clear through to the end plates 22 and 23 to serve as a bearing for these levers. The angle bar 88 is provided at its ends with the pins or projections 91, which extend into the cam slot 92 formed in the resetting bar 93, of which there is one at each end of the machine, suitably guided and operated, as will be hereinafter explained. As will be apparent from Fig. 8, the shape of the cam slot 92 is such that as the bars 93 are raised, the angle bar 88 will be actuated at the beginning of its upward movement to accurately position the keys. The register-frame rods 67 and 68 have their ends extended into a pair of cam slots 94 formed in the same resetting bars 93, and the cam portions of these slots 94, as best seen in Fig. 5, are so located that just after the positioning of the keys is effected by the angle bar 88, the registers are moved to the left and out of engagement with the bars 42, so that the keys are free to be re-set. The movement of the register-frame to the left is not sufficient to disengage the actuating bars 42 from the recesses 83, through which they pass and by which they are guided.

The interlocking mechanism, which is located at the lower ends of the interlocking straps 43, is best shown in Figs. 4, 6, 10, and 13 to 15. As will be seen, the straps 43 terminate in the circular enlargement 95, which has a vertical arm 96 projecting downward from one side thereof, the arm 96 being alternately on the opposite sides of the series. This arm 96 is provided with the offset 44 previously referred to, and passes through the hour-glass shaped aperture 97 in the arm 98 of the interlocking element 99, best seen in Figs. 13 and 14. The body of the interlocking element 99 is a disk, which is preferably open at the center, and has drawn thereon the two pairs of offset portions 100 and 101, the portions of each pair being diametrically opposed to each other and intermediate the portions of the other pair, and on opposite sides from the four intermediate portions 102, which are not offset. The offset portions 100 and 101 are connected with the non-offset portions 102 by the cam surfaces 103. These disks are so designed that when they are placed with the stems 98 extending alternately in opposite directions, as shown in Fig. 6, the offset portions nest. The disks are mounted in a bearing formed preferably by a heavy tube 104, which has two channels 105 and 106 cut therefrom, so that the stems 98 may extend through the channels, while the disk body portions of the elements rest rather snugly in the circular bearing formed for them by the tube. At suitable intervals, represented by the space devoted to a single office, I place in the tube 104 the limiting members 107, which are preferably formed of a plurality of the interlocking elements 99, with a portion of their stems cut off, secured together, and having a perforation 108 formed therein. When the devices are arranged in single candidate-to-be-elected groups, the spacing elements or limiting members 107 are held from movement by means of the pins 109, one of which is shown in Fig. 15, being passed through a plain aperture 110 in the lower portion of the tube 104, and through the apertures 108 in the spacer 107, and finally with its threaded top 111 screwed into a threaded aperture 112 in the upper portion of the tube. The offset 112ª on the pin 109 is preferably located so that the pin cannot be screwed in tightly enough to cause the tube to bind upon the disks contained therein. When several single-candidate groups are to be thrown together to form a multi-candidate group, the intermediate pins 109 are withdrawn, thus permitting the spacing blocks 107 to be moved along the tube freely just as the interlocking elements themselves are, so that the spacing elements 107 and the interlocking elements 99 can accommodate themselves to any desired arrangements of the keys. The displacement of the interlocking straps 43 from their normal vertical position, which may occur in exceptional cases of group voting, is taken care of by means of the lost motion formed by the connections between the straps 43 and the keys 33 and the interlocking elements 99. To prevent any possibility of the interlocking elements 99 tending to fall over sidewise in case an unusual grouping should open a wide space, I preferably pass the two wires 113 through the apertures in the disks on either side of the pins 109, and secure them at their ends by any suitable means. To prevent the pins 109 being misplaced when they are withdrawn, I preferably provide the double looped eyelets 114 upon the reduced portion of the head, and through the other loop of the eyelets I pass the cord 115, which is passed through between eyelets 116 supported from the bottom of the tube 104 between each pair of the pins 109, and give the string 115 just sufficient slack to remove one pin at a time, and secure it at its ends.

As will be apparent from an inspection of Fig. 6, when a key is operated, its interlocking strap 43 will be lifted and its associated interlocking element 99 swung up into the dotted-line position. This causes the interlocking strap 43 to swing forward or backward a short distance, but not sufficient to carry it entirely from between the adjacent interlocking straps, so that if it is desired to reset the key and the interlocking element tends to stick, the necessary pressure can be transmitted to it without difficulty, as the adjacent straps 43 prevent the one being returned from bending materially. To return the interlocking elements, and thereby the keys, to their normal position, I provide the rod or tube 117, which passes through the circular enlargements 95, and is supported at its ends by arms 118 which are secured to the shaft 119, which extends the length of the machine and is journaled in the castings 20 and 21, and which has, on the inside of these castings, the arms 120 secured thereto and provided with pins 121 projecting into the cam slots 122 formed in the ends of the resetting bars 93. The cam portion of this slot is, as will be readily apparent, so located as to swing the tube 117 from its full-line to its dotted-line position of Fig. 6 at the end of the upward movement of the resetting bars 93, thus resetting the keys at the final movement thereof.

To lock out all the registers of candidates for offices for which voters of a limited franchise are not entitled to vote, I provide the mechanism best shown in Figs. 4, 5, 6 and 10, where it will be seen that the straps 43 are provided with the projections 123. As a matter of fact, only the projections on the forward side are utilized, but in order that a single die may be employed to stamp out all of the straps 43 and the connected enlargement 95, and stem 96, I provide the projections 123 on both sides, so that the strap can be turned in either direction and still have a projection 123 available for use. Each office group is provided with a locking-out element or member 124, which preferably consists of a body portion having as many arms as there are different possible groupings with the mechanism, and with means for arranging these elements in the different positions upon the supporting shaft 125. I have shown the elements as arranged for six positions, and accordingly provided with five arms, and with the hexagonal aperture, so that they can be strung in any one of the six positions on the shaft. In the position shown, the projection 123 engages with the adjacent arm of the element 124 above it, and consequently no key can be operated in that office group. If the element were shifted through sixty degrees from the right over to the left, it would be apparent that there would be no arm in the path of the projection 123, and consequently the strap 43 could be lifted without any opposition. By varying the positions of these elements 124, any desired candidates can be locked out in any specific position of the shaft, and by shifting the shaft, it will be obvious that any necessary franchise limitations can be enforced. As a convenient means for supporting and moving the shaft, I mount it at its ends in the arms 126, which are pivoted on the shaft 119, and to rotate it to any desired position of adjustment, I provide the bevel pinion 127 on each end of the shaft meshing with the bevel pinions 128 secured on the countershafts 129, which are journaled in extensions 130 of the upper end of the arms 126, and which pass through apertures 131 in the front wall of the machine. Each shaft 129 is provided at its outer end with an operating handle or knob 131, and with an indicating dial 132, which shows what the adjustment of the shaft 125 is, and it is conveniently locked in any position of adjustment by means of the six equi-distant pins 133, which coöperate with six apertures 134 placed in the front plate 32.

From the foregoing description, it will be readily apparent that if the franchise is to be changed, the handle 131 at each end is seized and drawn out far enough to swing the arms of the elements 124 out of the range of the projections 123, after which one of the knobs 131 is turned until the desired new adjustment is indicated, after which the parts are swung back into position, with the pins 133 engaging the apertures 134. As the handles 131 are on the face of the machine, to prevent the surreptitious changing of the machine by a voter of limited franchise, the inclosing curtain will not extend down as far as the knobs 131, so that if the voter should attempt to manipulate them, this fact can be observed by the election officials.

The uppermost row of keys 33 is devoted to the yes and no propositions, and accordingly is not provided with the interlocking straps extending to the candidate-interlocking mechanism, but adjacent pairs of keys are arranged to be interlocked by a lever 135 pivoted to the rear of the front portion 28 of the casing, so as to coöperate with the shoulders 136 of the keys and prevent the simultaneous operation of the two keys thus grouped together in a manner which will be readily apparent to those skilled in the art.

Figure 1:
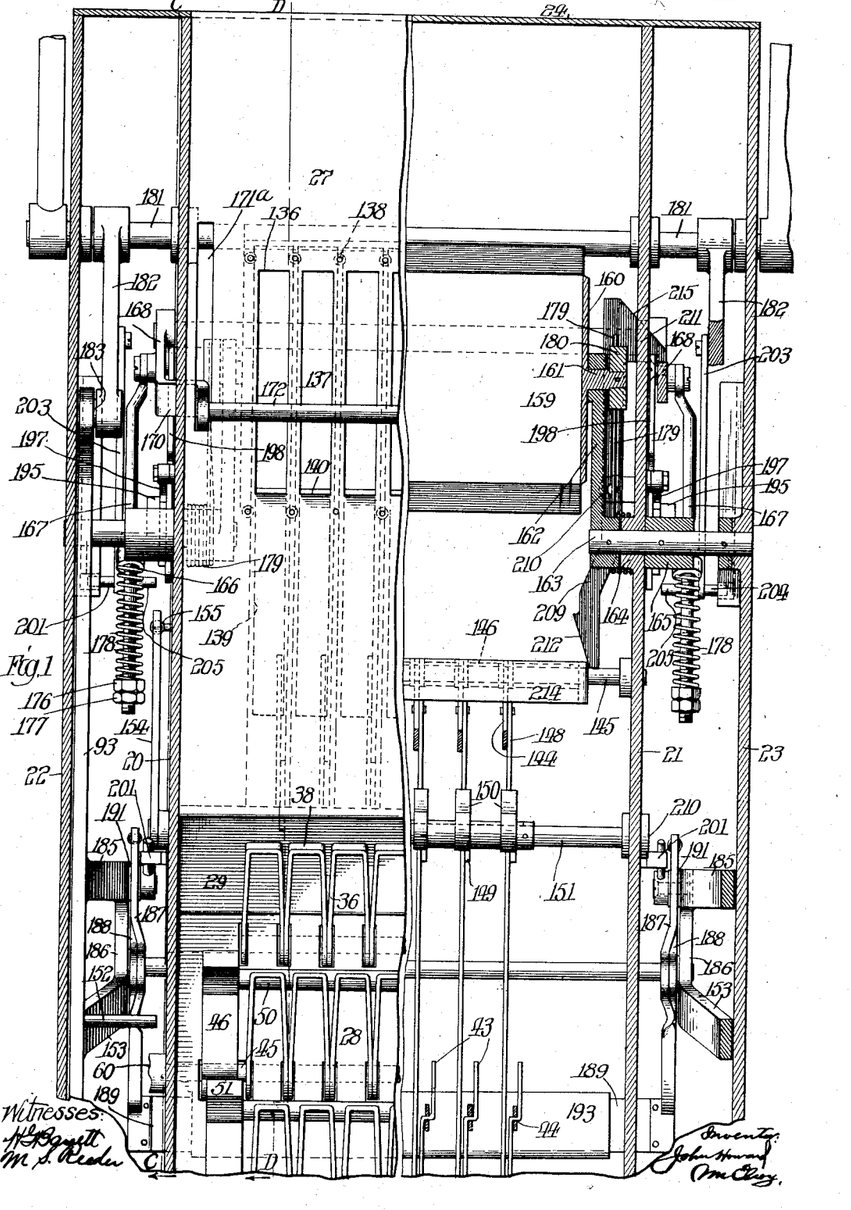
Figure 1 is a front elevation of the upper portion of the machine, with the left-hand side thereof in section on the line A—A of Fig. 2, and the right-hand side thereof in section on the line B—B of Fig. 3.
Figure 2:
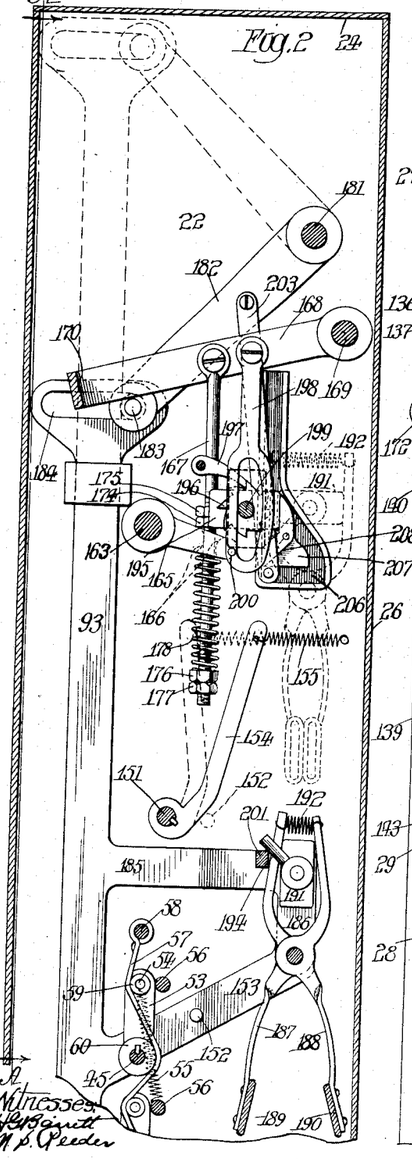
Figs. 2 and 3 are vertical sections of the upper portion of the machine, on the section lines C—C, and D—D, respectively, of Fig. 1.

Associated with the regular candidate voting mechanism is the free-balloting mechanism, best shown in Figs. 1, 2 and 3, where it will be seen that the front wall 27 is provided with an elongated rectangular aperture 136 for each office group of keys, and this aperture is normally closed by a cover plate 137, which is generally rectangular in outline, and is held in position by the pairs of rivets 138 on either side thereof coöperating with its edges. The lower portion of the cover plate 137 has an elongated rectangular aperture 139 therein of the proper size, shape and location to register with the aperture 136 when the slide is raised to its highest possible position, which raising is effected by lifting the slide by means of the projection 140 made of a portion of the material cut away to form the aperture 139, and which projects through the aperture 136. The lower end of the plate 137 is provided with the projection 141 extending inwardly, which projection has the horizontal slot 142 therein adapted to receive the pin 143 carried by the arm 144 pivoted at its rear end upon the rod 145 extending across the length of the machine. These arms 144 are spaced apart by sleeves 146 strung upon the shaft 145 between the arms. Pivoted to the arm 144 at 147 is an angular piece 148, which is riveted to and in fact may be considered as an extension of the interlocking strap 43, which, of course, extends to the candidate interlocking mechanism of that office group. The piece 148 has the ratchet teeth 149 formed on its lower end, and a pawl 150 placed upon the shaft 151 extending across the machine, engages said ratchet teeth to prevent the return of the cover plate after it has been once raised, as it would be possible to beat the machine if the cover plate could be returned after writing a name and setting the paper feeding mechanism for operation. Just prior to the resetting of the interlocking mechanism, the pawls 150 are rocked away from the ratchet teeth by reason of the pin 152 on the extension 153 of the resetting bar 93, contacting with the arm 154, which is secured to the end of the shaft 151, so as to rock the shaft when the arm is engaged by the pin 152 and swung from the full-line position to the dotted-line position. When the resetting is completed, the arm 154 is returned to its normal position by the spring 155 connected to one end thereof and to the casing of the machine. The pawl 150 is provided with the recess 156 therein, and the spline 157 in the rod 151, coöperating with the abutments formed by the ends of the recess, causes the pawl to be lifted when the shaft is rocked in the proper direction and permits the necessary movement of the pawl incidental to riding over the ratchet teeth 149.

In supplying the paper to be written upon, I dispense with the customary storage and supply rolls and the table over which the paper passes from the supply to the storage roll, and employ a flat roll of paper 158, which is mounted upon a substantial board 159 extending between the castings 20 and 21 and held by the end pieces 160, which are journaled by the bearings 161 in the upper ends of the arms 162, which are secured upon the rock shaft 163 journaled in the bearing 164 formed in the casting 20 or 21, as the case may be. The rock shaft 163 has secured on the other side of the casting, the arm 165, which is provided with the aperture 166 having the flaring edges, through which aperture passes the link 167, the upper end of which is pivoted to the adjacent arm 168 of the pair of arms pivoted at each end upon the pintles 169. These arms 168 are offset, as at 170, and pass through the slots 171 formed in the castings 20 and 21, so as to bring their inner ends near the ends of the front wall 27, so that they can pass through the vertical slots 171ª formed therein. The arms 168 are connected outside of the machine by the rod 172 extending across the front of the machine and in the path of the projections 140, so that when any cover plate is lifted, after it has moved a certain distance, its lug 140 will engage the rod 172 and necessitate the swinging of the arms 168 from their full-line position of Fig. 3 to their dotted-line position. This upward movement of the arms is resisted by the helically-coiled contractile-springs 173 secured to the arms and to the castings 20 and 21, so that the parts will be returned when the shaft 151 is shifted to release the interlocking straps 43. The link 167 is threaded throughout most of its length, so that the abutment nuts and set nuts 174 and 175, and 176 and 177, can be adjusted so as to cause the arms 162 and the board 159 to swing as may be desired. When the board is well filled, it will be obvious that the arms 162 need not be swung so far forward as when it is but partially filled, in order to bring the paper against the cover plates 137, so that it can be written upon through the apertures 136 and 139, as shown in dotted lines in Fig. 3. The helically-coiled expanding-spring 178 is placed on the link 167 between the abutment nut 176 and the arm 165, so as to permit the necessary yielding of the parts to automatically adjust the paper to any variation in the size. The bar 51 is held in one of two positions, at an angle of one hundred and eighty degrees to each other, by means of the springs 179, which are coiled about the bearing 174 and have the crossed parallel arms adapted to coöperate with the elongated rectangular blocks 180 secured upon the outer ends of the bearing pins 161.

It will be understood that after each movement of the bar 172 to bring the paper to the front for writing thereon, the portion of the paper that has been written upon is drawn off, and in being drawn off, the board 159 is rotated through one hundred and eighty degrees, as is possible when the parts are in the full-line position of Fig. 3. This drawing off of the paper is effected by means of the resetting bars 93, which, it may be here explained, are operated by means of the rock shaft 181, extending through the top of the machine and arranged to be moved through an angle of ninety degrees by the curtain mechanism, such, for instance, as is shown in my application for Patent, No. 348,987, filed December 21, 1906. The shaft 181 carries the arm 182, which have the pins 183 coöperating with the horizontal slots 184 in the enlarged head of the bar 93, which is supported at suitable intervals by guides to permit of its vertical reciprocation. The bars 93 are provided with extensions 153 and 185, which are preferably offset, as seen, to bring the connecting piece 186 into the proper vertical plane. Pivoted upon the connecting pieces 186 are the pair of arms 187 and 188, which do not cross each other, but are arranged so as to bring the bars 189 and 190, secured to the ends thereof and extending the length of the interior of the machine, together when the upper portions of the levers are spread apart by the block 191 pivoted upon the extension 185. The helically-coiled contractile-spring 192 connecting the upper ends of the arms 187 and 188, serves to draw the upper ends of the arms 187 and 188 together and to separate the bars 189 and 190 carried by the lower ends thereof. These bars 189 and 190 are preferably faced by rubber 193, or some similar material, adapted to take a good hold upon the paper, and there is enough spring in the lower portion of the arms 187 and 188 to insure the bars being tightly clasped together. The block 191 has rigidly secured thereto, the pin 194, which, when the rod 172 has been raised, is adapted to engage the rectangular elongated block 195, which has secured thereto the ratchet 196, the teeth of which are engaged by the dog 197 so as to prevent any backward movement thereof. The bar 168 is provided with the link 198, which embraces the pintle 199, upon which the block 195 and the ratchet 196 are journaled, and this link 198 carries a pin 200, which, as the arms 168 are raised, engages the teeth of the ratchet 196 and rotates it through ninety degrees to bring the block 195 into position so that it will be in the path of the pin 194. When it is at right angles to the position shown in Fig. 2, it will be obvious that the pin 194 will not be engaged thereby as the paper-gripping mechanism is raised from the full-line position to the dotted-line position. When the paper-gripping mechanism is lifted, it is open, and consequently does not engage the paper. At the limit of its upward movement, it is closed by the mechanism described, so that as the resetting bar is moved downward, the paper is gripped thereby and will be drawn off sufficiently to rotate the board 159 through one hundred and eighty degrees. The stroke is adjusted so as to draw off the average length of paper, and if too little is drawn off when the roll is full, and too much when the roll is nearly empty, the difference will be taken care of by the action of the springs 179 on the blocks 180. At the limit of its downward movement, the pin 194 engages the lug 201 projecting inward from the castings 20 and 21, so that the gripping mechanism is opened ready for a fresh ascent. To prevent the paper which has been drawn off from getting mixed up with the interlocking straps, I provide a recess for it by placing the thin metallic partition 202 between the castings 20 and 21, so as to form a receptacle for the paper.

It is necessary to provide means for turning the block 195 through an angle of ninety degrees after it has been turned to the position shown in Fig. 2, and, for this purpose, I provide the arm 203, pivoted to the arm 182 and provided with projections 204 and 205, which may be conveniently made of a single pin passed through the lower end of the arm. The projection 205 engages the end of the block 195 as it descends, if it is in the full-line position, but if it is in the dotted-line position, it is, of course, not engaged thereby. The pin 204 coöperates with the guide groove 206, which has the gravity switch plate 207 pivoted therein, so that as the arm descends, it will swing the switch plate to the right, but as the arm is raised, the pin 205 will engage the switch flange 208 carried by the switch plate 207 so as to swing the pin to the right, and consequently prevent its engaging the piece 195 when it has been set for operation.

I preferably provide means for locking the bar 172 from movement until one of the cover plates 137 has been lifted far enough to operate the interlocking mechanism to prevent anybody from idly operating the paper-feeding mechanism unless he is willing to lose a vote for some candidate in doing so. For this purpose, I pivot the locking dog 209 at 210 to a lug projecting from the castings 20 or 21, as the case may be, and at the upper end is a shoulder 211 adapted to engage the top of the bar 168, and at the lower end is a cam surface 212 adapted to be engaged by one of the arms 213 pivoted at either end on the shaft 145 and connected by the bar 214 resting on all the pieces 148, so that as any cover plate is lifted, the locking dog 209 will be rocked to release the lever 168 as the projection 140 reaches the rod 172. The top of the locking detent 209 is beveled, as seen at 215, so that it will be cammed aside by the bar 168 as it descends.

While I have herein shown and described a novel general construction of a voting machine; a novel straight-ticket mechanism; a novel key; and a novel free balloting mechanism, I do not herein claim the same, but reserve the subject matter thereof for divisional applications.

While I have herein shown and described my novel interlocking elements, consisting primarily of a thin, metallic disk having faces in three different planes on both sides connected by cam surfaces so as to spread whenever they are turned from an inoperative position (the adjacent ones being turned in opposite directions) but adapted to nest in an operative position, I do not herein claim the same broadly, as they are thus claimed in my application No. 587,350, filed October 17, 1910.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is,—

1. In an interlocking mechanism, the combination with the rotary cam members, of a cage adapted to contain the same, said members being rotatable on an axis parallel to the length of the cage, and means for limiting their longitudinal movement in the cage.

2. In an interlocking mechanism, the combination with the rotary cam members, of the keys, connections between the keys and cam members to swing the latter as the former are moved, a cage adapted to contain the cam members, said members being rotatable on an axis parallel to the length of the cage, and means for limiting their movement longitudinally of the cage.

3. In an interlocking mechanism, the combination with the rotary cam members divisible into groups, of a cage adapted to contain the same, movable cam abutments between the groups, and means for securing the abutments rigidly in the cage.

4. In an interlocking mechanism, the combination with the rotary cam members, of a cage adapted to contain the same, the alternate members being adapted to rotate in opposite directions, and means for limiting their longitudinal movement in the cage.

5. In an interlocking mechanism, the combination with the rotary cam members provided with stems, of the keys, connections between said keys and stems, the cage adapted to contain the cam members, the alternate members having their stems projecting, and being adapted to rotate in opposite directions, and means for limiting their longitudinal movement in the cage.

6. In an interlocking mechanism, the combination with the rotary cam members having disk-shaped bodies and stems, of the tubular cage in which the bodies fit having the channel cut away to allow the stems to project therefrom, and means for limiting the longitudinal movement of the members in the cage.

7. In an interlocking mechanism, the combination with the cam members having the disk-shaped bodies and stems, of the tubular cage in which they are mounted and adapted to rotate provided with the oppositely directed channels cut away therein through which the alternate stems project in opposite directions, and means for limiting the longitudinal movement of the members in the cage.

8. In an interlocking mechanism, the combination with the rotary cam members having disk-shaped bodies and stems, said members being divisible into groups, of the tubular cage with the channel therein through which the stems project, the movable cam abutments between the groups, and means for securing the abutments in the cage.

9. In an interlocking mechanism, the combination with the rotary cam members having disk-shaped bodies and stems, said members being divisible into groups, of the tubular cage with the channel therein through which the stems project, the movable cam abutments between the groups, and means for securing the abutments in the cage, consisting of screws passed through the tubular cage and apertures in the abutments and screwed into the other side of the cage.

10. The interlocking element, consisting of the thin metallic disk and stem, the disk having the engaging surfaces in three different planes connected by cam surfaces, and the stem being provided with the hour-glass shaped aperture.

11. In an interlocking mechanism, the combination with the annular rotary cam members, consisting of thin metallic disks, of means for rotating the alternate cams in opposite directions, said cam members being provided with coöperating engaging surfaces on their adjacent faces, stops to limit the movement of said cam members along the axis of their rotation, the tubular cage within which said cams rotate, and the wires extending through the centers of the disks.

12. In an interlocking mechanism, the combination with rotary cam members, of means for rotating the cams, said cam members being provided with coöperating engaging surfaces on their adjacent faces, stops to limit the movement of said cam members along the axis of their rotation, the cage in which said cam members and stops move, and pins for securing the stops in place, said pins being provided with the reduced threaded portion at one end, substantially as and for the purpose described.

13. In a device of the class described, the combination with the swinging members having the double-angled aperture therein, of the longitudinally movable member having the offset passed through said aperture.

14. In a device of the class described, the combination with the swinging member having the double angled aperture therein with its sides diverging at an angle equal to that through which the member swings, of the longitudinally movable member having the offset passed through said aperture.

15. In a device of the class described, the combination with the swinging member having the double angled aperture therein with its sides diverging at an angle equal to that through which the member swings, and its ends curved as shown, of the longitudinally movable member having the offset passed through said aperture.

16. In a device of the class described, the combination with the swinging key, of the swinging interlocking member, both the key and the member being provided with the double angled aperture therein, and the interlocking strap provided with offsets at its ends passing through said apertures.

17. In a voting machine, the combination with the interlocking elements, of the abutments between the office groups, the securing elements for said abutments, and the cord upon which said securing elements are mounted.

18. In a voting machine, the combination with the interlocking elements, of the abutments between the office groups, the securing elements for said abutments, the cord upon which said securing elements are mounted, and supports for the cord through which it can move between the securing elements.

19. In a voting machine, the combination with the interlocking elements, of the abutments between the office groups, the channel in which the elements and abutments move, the apertures in the channel and the abutments, the pins adapted to coöperate with said apertures, and the cord upon which the pins are mounted.

20. In a voting machine, the combination with the interlocking elements, of the abutments between the office groups, the channel in which the elements and abutments move, the apertures in the channel and the abutments, the pins adapted to coöperate with said apertures, the cord upon which the pins are mounted, and the eyes between the pins and through which the cord passes.

21. In a voting machine, the combination with the interlocking elements, of the abutments between the office groups, the channel in which the elements and abutments move, the securing pins for said abutments threaded at one end, the cord upon which said securing elements are mounted, and the links connecting the heads of the pins with the cord so that the pins may be rotated.

22. In a voting machine, the combination with keys arranged in office groups, of a supporting member adjustable into three or more equidistant positions, and locking members for the keys of each office group capable of being placed in any one of three or more positions on said supporting member, and each provided with one less locking shoulder than the number of positions into which it may be placed.

23. In a voting machine, the combination of keys arranged in office groups, of a supporting member adjustable into three or more positions, locking members for the keys of each office group capable of being placed in any one of three or more positions on said supporting member, and each provided with one less locking shoulder than the number of positions into which it may be placed, and means for translating said supporting member in one or the other of two positions, in one of which the locking members are operated to lock out some of the keys and the other in which none of the keys are locked out.

24. In a voting machine, the combination of keys arranged in office groups, of a supporting member adjustable into three or more positions, locking members for the keys of each office group capable of being placed in any one of three or more positions on said supporting member, and each provided with one less locking shoulder than the number of positions into which it may be placed, means for translating said supporting member in one or the other of two positions, in one of which the locking member operates to lock out some of the keys and the other in which none of the keys are locked out, and mechanism for adjusting said supporting member when it is in the second position.

25. In a voting machine, the combination with keys arranged in office groups, of a supporting member adjustable into three or more equidistant positions, locking members for the keys of each office group capable of being placed in any one of three or more positions on said supporting member, means for translating said supporting member in one or the other of two positions, in one of which the locking members operate to lock out some of the keys and the other in which none of the keys are locked out, and mechanism for adjusting said supporting member when it is in the second position.

26. In a device of the class described, the combination with the keys arranged in office groups, of a controlling member for each group separately adjustable to different positions in which the keys may or may not be operated, means for simultaneously adjusting all the members to different positions while maintaining their original relative adjustment, and means for moving the members into and out of engaging position, said simultaneous adjustment being possible when the members are out of engaging position.

27. In a device of the class described, the combination with the keys arranged in office groups, of interlocking mechanism therefor, a controlling member for the interlocking mechanism of each group separately adjustable to different positions in which the keys may or may not be operated, means for simultaneously adjusting all the members to different positions while maintaining their original relative adjustment, and means for moving the members into and out of engaging position, said simultaneous adjustment being possible when the members are out of engaging position.

28. In a device of the class described, the combination with the keys arranged in office groups, of a controlling member for each group, composed of a hub having a plurality of arms less than the number of positions into which it may be adjusted, a rod upon which said hubs are strung in their different positions, and means for rotating said rod.

29. In a device of the class described, the combination with the keys arranged in office groups, of a controlling member for each group, composed of a hub having a plurality of arms less than the number of positions into which it may be adjusted, a rod upon which said hubs are strung in their different positions, and means for rotating said rod and moving it into and out of engaging position.

30. In a device of the class described, the combination with the keys arranged in office groups, of a controlling member for each office group, composed of a hub having a plurality of arms less than the number of positions into which it may be adjusted, a supporting shaft for said hubs having as many equal angles as there are positions of adjustment, and means for rotating said shaft.

31. In a device of the class described, the combination with the keys arranged in office groups, of a controlling member for each group composed of a hub having a plurality of arms less than the number of positions into which it may be adjusted, a supporting shaft for said hubs having as many equal angles as there are positions of adjustment, and means for rotating said shaft and moving it into and out of engaging position.

32. In a device of the class described, the combination with the keys arranged in office groups, of a controlling member for each group composed of a hub having a plurality of tangential arms less than the number of positions into which it may be adjusted, and means for simultaneously adjusting all of the members to different positions while maintaining their original relative adjustment.

33. In a voting machine, the combination with the interlocking elements having their stems projecting on opposite sides of the supporting member, of the straps having the enlargement at the end, and the extensions on either side of the enlargements engaging the stems.

34. In a voting machine, the combination with the interlocking elements having their stems projecting on opposite sides of the supporting element, of the straps having the aperture enlargement at the end, the extensions on either side of the enlargement engaging the stems, a resetting bar extending through the apertures, and means for reciprocating the bar to reset the machine.

35. In an interlocking mechanism, the combination with the rotary interlocking members mounted so that the alternate ones must be rotated in opposite directions, of the stems projecting alternately in opposite directions from said members, the strap elements extending to near the stems in the same plane and provided with apertures, and having the portions engaging the stems correspondingly alternated, and the common reciprocating resetting member passing through said apertures.

36. In a device of the class described, the combination with interlocking members having cam surfaces thereon formed by drawing out a portion of the body of said member, of guiding mechanism for said members, and stops to limit the number of said members that may be simultaneously operated.

37. In a device of the class described, the combination with a member moving through the arc of a circle and having an hour-glass-shaped recess therein, of a strap coöperating therewith and having an offset portion passing through the recess.

38. In a device of the class described, the combination with a member moving through the arc of a circle, of a swinging key, said key and member being provided with an hour-glass-shaped recesses therein, and a connecting strap coöperating with said key and member, and having offset portions passing through the recesses.

39. In a device of the class described, the combination with a plurality of keys, of a corresponding plurality of interlocking members moving through the arc of a circle and having hour-glass-shaped recesses therein, of connecting straps to their respective keys and interlocking members, the connection with the interlocking member being by the offset portion passing through the recess, the connection being such as to provide lost motion between the key and interlocking member.

40. In a device of the class described, the combination with a plurality of keys, of a corresponding plurality of interlocking members moving through the arc of a circle, said keys and members being provided with hour-glass-shaped recesses therein, and interlocking straps coöperating therewith and having the offset portions passing through said recesses, the thickness of said offset portions being less than the width of the recesses.

41. In a device of the class described, the combination with a swinging member having a double angled aperture therein, of a longitudinally movable member having an offset passed through said aperture.

42. In a device of the class described, the combination with a swinging member having a double angled aperture therein with its sides diverging at an angle equal to that through which the member swings, of a longitudinally movable member having an offset passed through said aperture.

43. In a device of the class described, the combination with a swinging member having a double angled aperture therein with its sides diverging at an angle equal to that through which the member swings, and its ends curved as shown, of a longitudinally movable member having an offset passed through said aperture.

44. In a device of the class described, the combination with a swinging key, of an interlocking member, both key and member being provided with a double angled aperture therein, and an interlocking strap provided with offsets at its ends passing through said apertures.

45. In a device of the class described, the combination with reciprocating members having recesses therein, of straps having offsets passing through said recesses and extending in the same direction throughout their length except for the offset portions.

46. In a device of the class described, the combination with reciprocating members having recesses therein, of straps having offsets passing through said recesses, and extending in the same direction throughout their length except for the offset portions and provided with extensions beyond said offsets.

47. In a device of the class described, the combination with reciprocating interlocking members, of keys associated therewith, said members and keys being provided with recesses therein, and connecting straps having offsets passing through said recesses, and extending in the same direction throughout their length except for the offset portions.

48. In a device of the class described, the combination with reciprocating interlocking members, of keys associated therewith, said members and keys being provided with recesses therein, and connecting straps having offsets passing through said recesses, and extending in the same direction throughout their length except for the offset portions, and having the extensions beyond said offsets.

In witness whereof, I have hereunto set my hand and affixed my seal, this 21st day of February, A. D. 1907.

JOHN HOWARD McELROY. [L. S.]

Witnesses:
JULIA M. BRISTOL,
DAISY W. PADEN.

---

Copies of this patent may be obtained for five cents each, by addressing the "Commissioner of Patents, Washington, D. C."